United States Patent
Azadet et al.

(10) Patent No.: US 7,610,495 B2
(45) Date of Patent: Oct. 27, 2009

(54) METHOD AND APPARATUS FOR POWER MANAGEMENT USING TRANSMISSION MODE WITH REDUCED POWER

(75) Inventors: Kameran Azadet, Morganville, NJ (US); Leilei Song, Eatontown, NJ (US)

(73) Assignee: Agere Systems Inc., Allentown, PA (US)

( * ) Notice: Subject to any disclaimer, the term of this patent is extended or adjusted under 35 U.S.C. 154(b) by 743 days.

(21) Appl. No.: 10/874,834

(22) Filed: Jun. 23, 2004

(65) Prior Publication Data

US 2005/0114721 A1    May 26, 2005

Related U.S. Application Data

(60) Provisional application No. 60/525,231, filed on Nov. 25, 2003.

(51) Int. Cl.
  G06F 1/00    (2006.01)
  G06F 1/26    (2006.01)
  G06F 1/32    (2006.01)

(52) U.S. Cl. .............. 713/300; 713/320; 455/127.1; 455/127.5; 455/522; 455/574

(58) Field of Classification Search .......... 713/300, 713/320, 322, 340; 455/67.11, 127.5, 574, 455/855, 127.1, 522
  See application file for complete search history.

(56) References Cited

U.S. PATENT DOCUMENTS

| | | | | |
|---|---|---|---|---|
| 5,448,773 A | | 9/1995 | McBurney et al. | 455/343 |
| 5,532,935 A | * | 7/1996 | Ninomiya et al. | 700/296 |
| 5,696,903 A | * | 12/1997 | Mahany | 709/228 |
| 6,131,166 A | * | 10/2000 | Wong-Insley | 713/300 |
| 6,313,832 B1 | * | 11/2001 | Ishida | 345/211 |
| 6,411,457 B2 | * | 6/2002 | Yamashita et al. | 360/73.03 |
| 6,473,797 B1 | * | 10/2002 | Hirasawa | 709/224 |
| 6,516,361 B2 | * | 2/2003 | Lym et al. | 710/56 |
| 6,608,476 B1 | * | 8/2003 | Mirov et al. | 324/103 R |
| 6,622,252 B1 | * | 9/2003 | Klaassen et al. | 713/320 |
| 6,665,810 B1 | * | 12/2003 | Sakai | 713/600 |
| 6,731,957 B1 | | 5/2004 | Shamoto et al. | 455/574 |
| 6,898,438 B1 | * | 5/2005 | Uchida | 455/522 |
| 7,027,843 B2 | * | 4/2006 | Cromer et al. | 455/574 |

(Continued)

FOREIGN PATENT DOCUMENTS

EP    1 292 040 A2    12/2003

OTHER PUBLICATIONS

Newton Harry, Newton's Telecom Dictionary, Feb. 2002, CMP Books, 18th Ed., p. 579.*

(Continued)

*Primary Examiner*—Mark Connolly
(74) *Attorney, Agent, or Firm*—Ryan, Mason & Lewis, LLP

(57) ABSTRACT

A method and apparatus are disclosed for power management of an electronic device. The present invention reduces power consumption of an electronic device that communicates over a network by selecting a transmission mode with reduced power consumption as the battery level gets lower. A disclosed power management process monitors the battery level of an electronic device and selects a transmission mode (e.g., a transmission rate) with a lower power consumption when the battery power level reaches one or more predefined threshold levels.

20 Claims, 4 Drawing Sheets

U.S. PATENT DOCUMENTS

2002/0065062 A1    5/2002  Levesque ................... 455/343
2003/0131267 A1*   7/2003  Berthoud .................. 713/300
2003/0229813 A1*  12/2003  Shiiyama .................. 713/300
2004/0041697 A1*   3/2004  Nattkemper et al. ... 340/310.01
2005/0047382 A1*   3/2005  Park et al. ................ 370/338

OTHER PUBLICATIONS

Hayashi Kazumi, "Bluetooth System and Bluetooth Mounted Device," Patent Abstracts of Japan, Publication No. 2002 290320A (Oct. 4, 2002).

* cited by examiner

300

POWER MANAGEMENT DATABASE

|  | BATTERY LEVEL THRESHOLD<br>330 | BIT RATE<br>340 | TRANSMISSION MODE<br>350 |
|---|---|---|---|
| 301 | 85-100% | 1 Gbps | FULL DUPLEX |
| 302 | 50-84% | 100 Mbps | FULL DUPLEX |
| 303 | 40-49% | 10 Mbps | FULL DUPLEX |
|  | ... | ... | ... |
| 305 | 10-29% | 10 Mbps | HALF DUPLEX |

METHOD AND APPARATUS FOR POWER MANAGEMENT USING TRANSMISSION MODE WITH REDUCED POWER

CROSS-REFERENCE TO RELATED APPLICATIONS

The present application claims priority to U.S. Provisional Patent Application Ser. No. 60/525,231, filed Nov. 25, 2003, incorporated by reference herein.

FIELD OF THE INVENTION

The present invention relates generally to power management techniques and, more particularly, to power management techniques in network devices, such as gigabit Ethernet cards.

BACKGROUND OF THE INVENTION

Portable electronic devices, such as portable computers, personal digital assistants (PDAs), and cellular telephones, typically include a battery to provide power to the portable device. In order to maximize battery life and avoid loss of data, most portable electronic devices include power management techniques. Battery life is typically addressed by reducing the power consumption of a device when the device is not used for a period of time, such as shutting down the device or entering a low power consumption state (e.g., a sleep mode). Further, portable electronic device that include a memory, such as a random access memory (RAM), must retain some minimum battery power level to preserve the stored data. Thus; to avoid loss of data, such electronic devices typically perform a controlled shut down before a certain minimum battery level is reached.

Power management techniques thus reduce power consumption at the expense of one or more of system specifications, such as speed, noise, battery life or processing speed. Most power management techniques only define active and power saving states for network devices based on network activity and device usage. For example, when there is no traffic on both the receive and transmit paths for a predefined minimum time period, the power management software will typically shut down the device or enter a low power consumption state.

A need therefore exists for a method and apparatus for providing improved power management techniques that reduce power consumption by selecting a transmission mode with reduced power consumption as the battery level gets lower.

SUMMARY OF THE INVENTION

Generally, a method and apparatus are disclosed for power management of an electronic device. The present invention reduces power consumption of an electronic device that communicates over a network by selecting a transmission mode with reduced power consumption as the battery level gets lower. A disclosed power management process monitors the battery level of an electronic device and selects a transmission mode (e.g., a transmission rate) with a lower power consumption when the battery power level reaches one or more predefined threshold levels.

A more complete understanding of the present invention, as well as further features and advantages of the present invention, will be obtained by reference to the following detailed description and drawings.

DETAILED DESCRIPTION

The present invention provides improved power management techniques that reduce power consumption by selecting a transmission mode with reduced power consumption as the battery level gets lower. A power management process 400, discussed below in conjunction with FIG. 4, monitors the battery level of an electronic device and selects a transmission mode (e.g., a transmission rate) with a lower power consumption when the battery power level reaches one or more predefined threshold levels. In this manner, the power management process 400 keeps the network link active for receiving and transmitting packets, while reducing the power consumption. The exemplary power management techniques are meant to supplement the conventional power management techniques that would be commonly found in commercial electronic devices 200.

Figure 1:
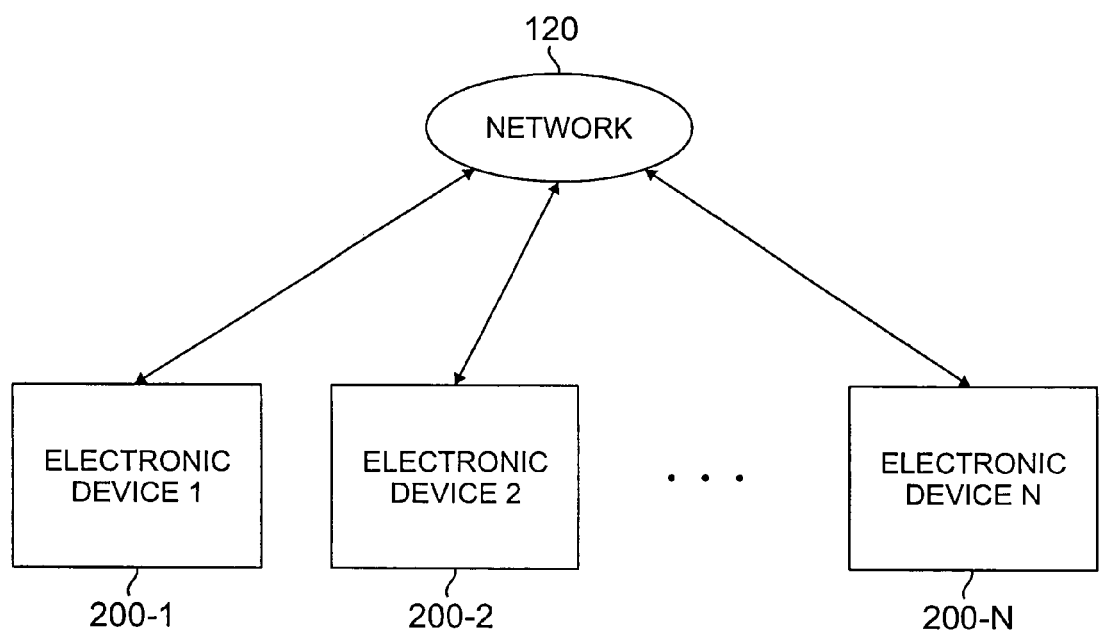
FIG. 1 illustrates an exemplary network environment in which the present invention can operate.

FIG. 1 illustrates an exemplary network environment in which the present invention can operate. As shown in FIG. 1, one or more electronic devices 200-1 through 200-N (hereinafter, collectively referred to as electronic devices 200, discussed below in conjunction with FIG. 2, communicate over a network 120. The network 120 may be embodied as any private or public wired or wireless network, including the Public Switched Telephone Network, a Private Branch Exchange switch, a wireless local area network (WLAN), for example, in accordance with one or more of the IEEE 802.11 a/g/b standards, Internet, or cellular network, or some combination of the foregoing. While the present invention is illustrated using a client side implementation, where the features of the present invention are resident on the electronic device 200, the features and functions of the present invention may be deployed on a number of distributed devices or servers, as would be apparent to a person of ordinary skill in the art.

Figure 2:
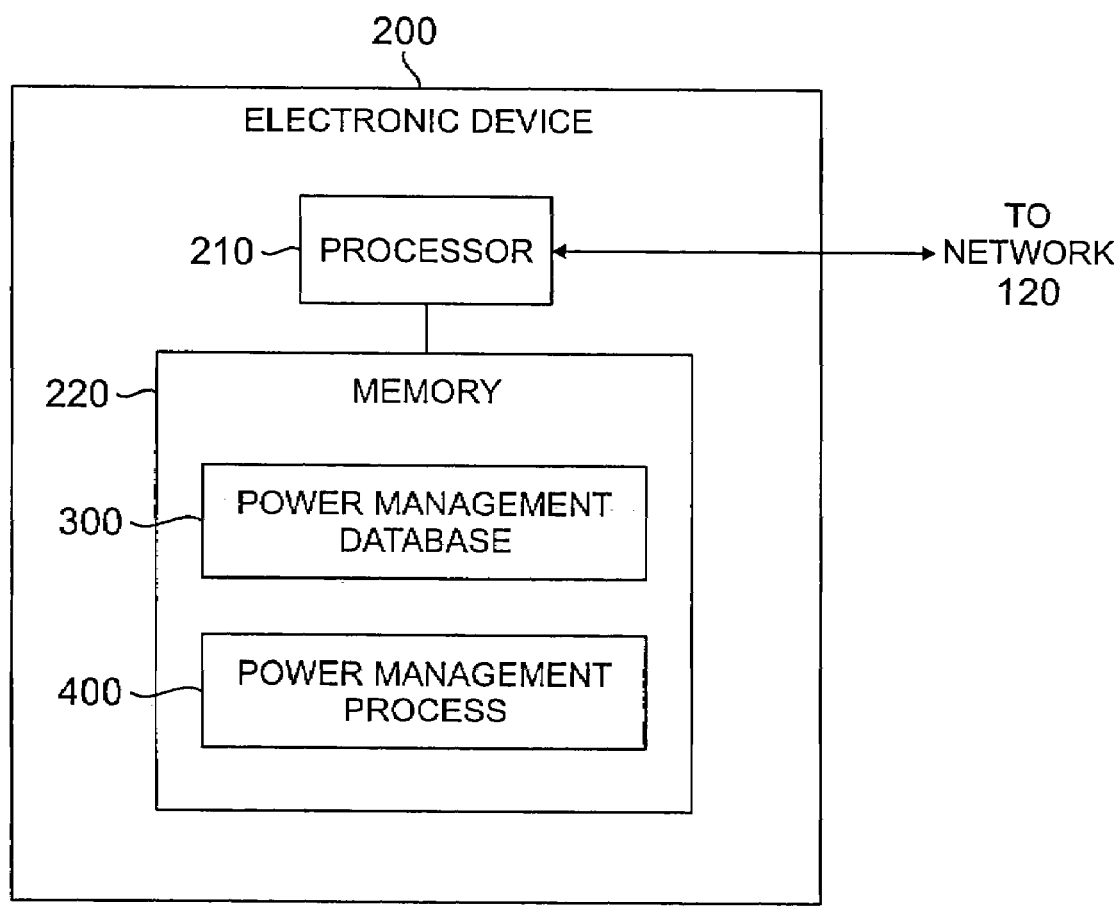
FIG. 2 is a schematic block diagram of an exemplary electronic device incorporating features of the present invention.

FIG. 2 is a schematic block diagram of an exemplary electronic device 200 incorporating features of the present invention. The electronic device 200 may be any battery operated device that communicates over a network 120, such as a portable computer, personal digital assistant (PDA) or cellular telephone. As shown in FIG. 2, the exemplary electronic device 200 includes a processor 210 and a memory 220, in addition to other conventional elements (not shown). The processor 210 operates in conjunction with the memory 220 to execute one or more software programs. Such programs may be stored in memory 220 or another storage device accessible to the electronic device 200 and executed by the processor 210 in a conventional manner.

For example, the memory 220 may store a power management database 300 and a power management process 400. Generally, the power management database 300 identifies an appropriate transmission mode (e.g., a transmission rate) for one or more predefined battery power threshold levels. The power management process 400 monitors the battery level of an electronic device 200 and selects a transmission mode with a lower power consumption when the battery power level reaches one or more predefined threshold levels. For example, the power management process 400 can monitor the system battery power level and reduce the network link rate, for example, from 1 Gbps to 10 Mbps, as the battery power level gets lower.

Figure 3:
FIG. 3 is a sample table describing an exemplary implementation of a power management database of FIG. 2.

FIG. 3 is a sample table describing an exemplary implementation of a power management database 300 incorporating features of the present invention. As previously indicated, the power management database 300 identifies an appropriate transmission mode (e.g., a transmission rate) for one or more predefined battery power threshold levels. As shown in FIG. 3, the power management database 300 includes a number of records 301-305, each associated with a different battery level threshold range. For each threshold range identified in field 330, the power management database 300 identifies a corresponding bit rate and transmission mode in fields 340, 350, respectively.

It is noted that the table-based implementation described herein is for illustration. The power management techniques described herein can be implemented in various ways, consistent with the scope of the present invention. For example, in a dynamic implementation, the power management process 400, discussed below, can periodically collect data evaluating the power consumption of the electronic device 200 in various transmission modes, and use the collected information to establish one or more dynamic thresholds, without the creation of an explicit power management database 300. In a further variation, the collected data can be used to populate the power management database 300.

The exemplary data recorded in the power management database 300 may be associated, for example, with a portable computer, such as a laptop, having a 10/100/1000 BaseT gigabit Ethernet card. The exemplary device can have a maximum power mode that is employed when the battery level is above a predefined threshold, and having a maximum throughput, such as 1000 BaseT, 1 Gbps, full duplex transmission. When the battery level falls below the predefined threshold, the device 200 can switch to a lower power mode, having a reduced throughput, such as 10 BaseT, 10 Mbps, half duplex transmission.

Figure 4:
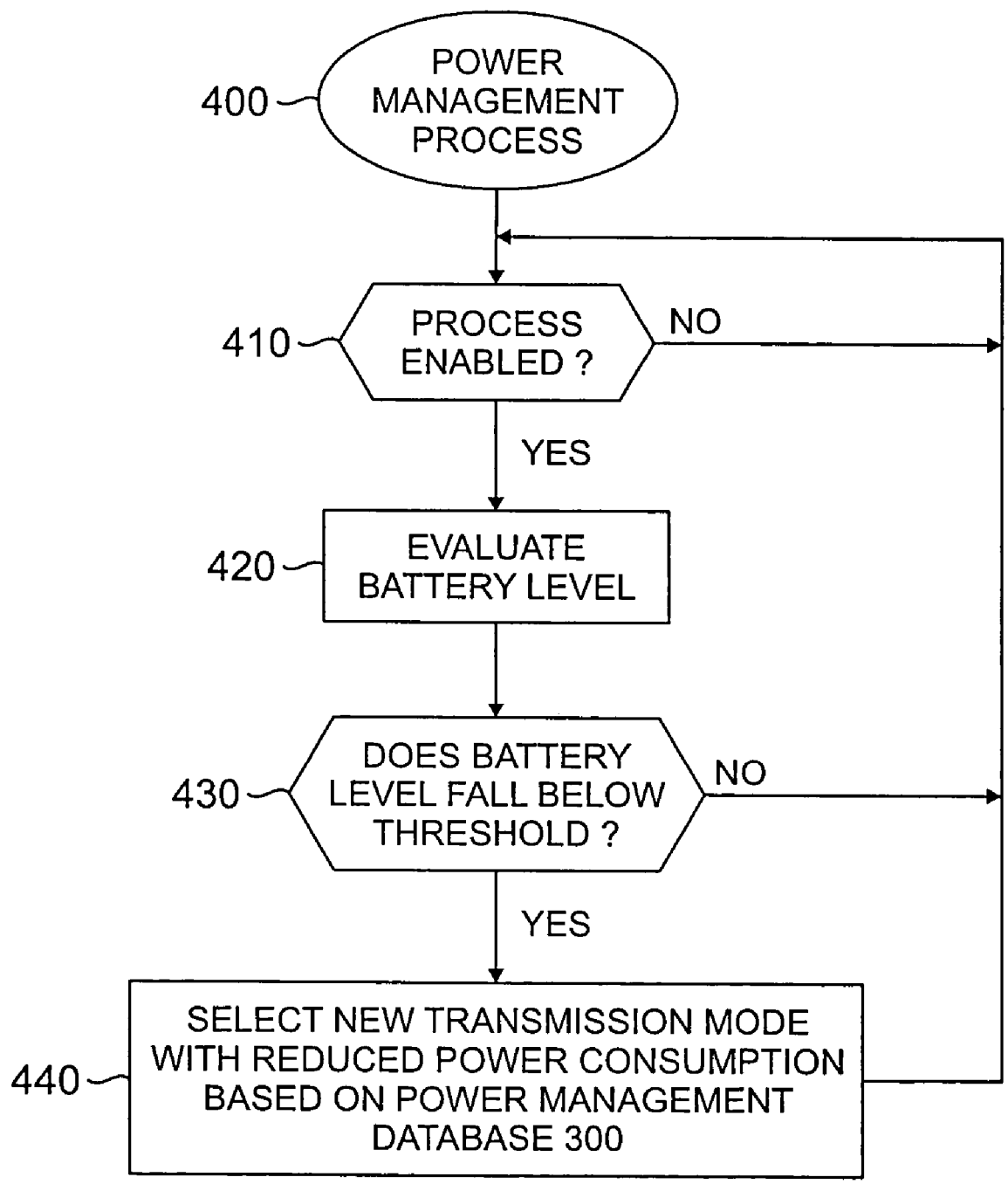
FIG. 4 is a flow chart describing an exemplary implementation of a power management process that is implemented by an electronic device of FIG. 2.

FIG. 4 is a flow chart describing an exemplary implementation of a power management process 400 incorporating features of the present invention. Generally, the power management process 400 monitors the battery level of an electronic device 200 and selects a transmission mode with a lower power consumption when the battery power level reaches one or more predefined threshold levels. For example, the power management process 400 can monitor the system battery power level and reduce the network link rate, for example, from 1 Gbps to 10 Mbps, as the battery power level falls below a threshold.

The exemplary power management process 400 can be implemented, for example, in a device driver and can be selectively enabled by the user, for example, using a control panel interface of an operating system, such as Microsoft Windows™. When enabled, the power management process 400 may provide a power savings of up to a factor of five, relative to no power management. More importantly, the power management process 400 reduces the system activities caused by network traffic and helps to extend battery life.

As shown in FIG. 4, the power management process 400 initially performs a test during step 410 to determine if the power management process has been enabled. If it is determined during step 410 that the power management process has not been enabled, then program control returns to step 410 until the power management process is enabled.

Once it is determined during step 410 that the power management process has been enabled, then the battery level of the electronic device 200 is evaluated during step 420. A test is performed during step 430 to determine if the measured battery level falls below a predefined threshold level, such as a level identified in the power management database 300. If it is determined during step 430 that the measured battery level has not fallen below a predefined threshold level, then program control returns to step 410 and continues in the manner described above.

If, however, it is determined during step 330 that the measured battery level has fallen below a predefined threshold level, then a new transmission mode with reduced power consumption is selected during step 440, for example, based on information contained in the power management database 300.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for power management in an electronic device that communicates over a network, said method comprising the steps of:

monitoring a battery level of said electronic device;

evaluating a power consumption of said electronic device in one or more transmission modes;

establishing one or more threshold levels based on said power consumption information; and selecting a rate of a substantially continuous transmission mode based on a comparison of said battery level to said one or more threshold levels.

2. The method of claim 1, wherein said selecting step further comprises the step of selects a transmission mode with a lower power consumption when said battery level reaches one or more predefined threshold levels.

3. The method of claim 2, wherein said transmission modes and corresponding predefined threshold levels are stored in a table.

4. The method of claim 1, wherein said monitoring step is performed periodically.

5. The method of claim 1, wherein said transmission mode includes a transmission rate.

6. The method of claim 1, wherein said method may be selectively disabled by a user.

7. The method of claim 1, further comprising the step of evaluating a power consumption of said electronic device in one or more transmission modes is performed periodically.

8. The method of claim 1, further comprising the step of notifying a user that said transmission mode has been adjusted based on said battery level.

9. An electronic device, comprising:
   one or more batteries;
   one or more ports for network communication;
   a memory; and
   at least one processor, coupled to the memory, operative to:
   monitor a battery level of said electronic device;
   evaluate a power consumption of said electronic device in one or more transmission modes;
   establish one or more threshold levels based on said power consumption information; and
   select a rate of a substantially continuous transmission mode based on a comparison of said battery level to said one or more threshold levels.

10. The electronic device of claim 9, wherein said processor is further configured to select a transmission mode with a lower power consumption when said battery level reaches one or more predefined threshold levels.

11. The electronic device of claim 10, wherein said transmission modes and corresponding predefined threshold levels are stored in a table in said memory.

12. The electronic device of claim 9, wherein said processor is further configured to perform said monitoring step periodically.

13. The electronic device of claim 9, wherein said transmission mode includes a transmission rate.

14. The electronic device of claim 9, wherein said processor is further configured to selectively disable said battery monitoring and selection of a transmission mode.

15. The electronic device of claim 9, wherein said processor is further configured to perform said evaluation of a power consumption of said electronic device in one or more transmission modes periodically.

16. The electronic device of claim 9, wherein said processor is further configured to notify a user that said transmission mode has been adjusted based on said battery level.

17. A power management driver for an electronic device that communicates over a network, said driver implementing the steps of:
   monitoring a battery level of said electronic device;
   evaluating a power consumption of said electronic device in one or more transmission modes;
   establishing one or more threshold levels based on said power consumption information; and
   selecting a rate of a substantially continuous transmission mode based on a comparison of said battery level to said one or more threshold levels.

18. The power management driver of claim 17, wherein said selecting step further comprises the step of selects a transmission mode with a lower power consumption when said battery level reaches one or more predefined threshold levels.

19. The power management driver of claim 17, wherein said transmission mode includes a transmission rate.

20. The power management driver of claim 17, wherein said power management driver may be selectively disabled by a user.

* * * * *